Patented Jan. 20, 1948

2,434,888

UNITED STATES PATENT OFFICE 2,434,888

HYDROGEN BROMIDE-CATALYZED OXIDATION

Frederick F. Rust and John H. Raley, Berkeley, Calif., assignors to Shell Development Company, San Francisco, Calif., a corporation of Delaware No Drawing. Application October 10, 1944, Serial No. 558,111

5 Claims. (Cl. 260—610)

This invention relates to the controlled non-explosive oxidation of various organic compounds containing at least one replaceable hydrogen atom and more particularly pertains to an improved process for obtaining high yields of certain predetermined oxygenated products, such as carboxylic acids, alcohols, ketones, organic hydroperoxides, and/or organic peroxides, by the catalytic oxidation of organic compounds, particularly hydrocarbons and their halo-substituted derivatives. In one of its most specific embodiments, the invention is directed to the activation of surfaces of reactors employed for such catalytic oxidation of the organic compounds to produce the mentioned and other oxygenated compounds having either the same or twice the number of carbon atoms per molecule as the primary starting material treated. The invention is also directed to the process of effecting the mentioned controlled oxidation in such reactors, the walls of which have been activated.

It has been discovered that carboxylic acids, ketones, alcohols, organic hydroperoxides and/or organic peroxides (i. e. compounds wherein two organic radicals are attached to the peroxy oxygen atom) may be produced by subjecting organic compounds having at least one replaceable hydrogen atom to a partial oxidation in the presence of hydrogen bromide which catalyzes and controls the reaction. More specifically stated, it has been discovered that the above-mentioned and hereinbelow more fully described organic compounds may be subjected to a controlled non-explosive oxidation in the presence of a catalyst consisting of or comprising hydrogen bromide to produce high yields of the desired oxygenated products, such as the carboxylic acids, ketones, organic hydroperoxides and/or organic peroxides, containing at least the same number of carbon atoms per molecule as the starting organic material thus subjected to oxidation. For instance, U. S. patent application Serial No. 474,220, filed January 30, 1943, discloses and claims a process for the controlled partial and non-explosive oxidation of aliphatic and particularly saturated aliphatic hydrocarbons and of their products of partial halogenation to produce carboxylic acids and/or ketones having the same number of carbon atoms per molecule as the starting material treated. In accordance with the process disclosed and claimed in said application, this oxidation is effected by subjecting the stated saturated organic materials, e. g. ethane, propane or butane, as well as their products of halo-substitution, to the action of oxygen at an elevated temperature below that at which spontaneous combustion of the mixture occurs, this oxidation being effected in the presence of a catalyst comprising or consisting of hydrogen bromide. Also, U. S. patent application Serial No. 474,221, filed January 30, 1943, now abandoned, covers a process for the controlled, non-explosive oxidation of aromatic hydrocarbons and particularly of alkylated aromatic hydrocarbons to produce phenol, substituted phenols, aromatic carboxylic acids, ketones and the like having the same number of carbon atoms per molecule as the starting material, this oxidation being effected at an elevated temperature (which is preferably above about 100° C. but below the temperature capable of causing spontaneous combustion) and in the presence of hydrogen bromide employed as the catalyst. U. S. Patent No. 2,369,181 discloses and claims a similar process for the production of predetermined oxygenated products by the catalytic oxidation, under non-explosive conditions and in the presence of hydrogen bromide, of alicyclic hydrocarbons and of their halogenated derivatives; while U. S. Patent No. 2,395,523 covers a process for the production of novel organic peroxides and organic hydroperoxides by the controlled oxidation of unsubstituted or halo-substituted isoparaffins such as isobutane, isopentane and the like. U. S. Patent No. 2,369,182 is directed to the production of certain unsaturated carboxylic acids and/or ketones by the controlled hydrogen bromide-catalyzed oxidation under non-explosive conditions of unsaturated organic compounds, e. g. unsaturated aliphatic hydrocarbons, while U. S. Patent No. 2,373,240 covers a process for the production of unsubstituted and halo-substituted unsaturated carboxylic acids by the controlled hydrogen bromide-catalyzed oxidation of halogenated unsaturated hydrocarbons. In all of these cases the controlled oxidation is effected in the presence of a catalyst consisting of or comprising hydrogen bromide which may be introduced as such into the reaction zone or formed in situ under the operating conditions employed.

The above-outlined inventions are predicated on the discovery that the presence of hydrogen bromide during the catalytic oxidation of the various organic compounds more fully described hereinbelow controls the oxidation reaction so that the oxidation ocurs on the carbon atom or atoms to which a halogen atom, e. g. bromide atom, would normally attach itself if the starting material were to be subjected to a halo-substitution reaction. Also, it appears that the presence of the hydrogen bromide, besides retarding the explosion or complete combustion of the organic starting material, has the effect of inhibiting the decomposition of the carbon structure of the starting organic material so that the resultant oxygenated compound or compounds contain the same number of carbon atoms per molecule as the starting material treated.

Although the above-mentioned catalyzed oxidation may be effected at least in some instances in the liquid phase, it is generally preferable to maintain the reactants and the reaction product in the vapor phase. One method of effecting this reaction is to preheat the organic compound, oxygen or an oxygen-containing gas, and the hydrogen bromide to the desired or optimum temperature, either separately or after commingling, and then conveying the vaporous mixture through a reaction zone maintained at the desired or optimum reaction temperature, the rate of throughput being regulated so as to maintain the reactants in contact with the catalyst in said reaction zone for a period of time sufficient to cause the interaction and formation of the desired oxygenated products. Although the oxidation reaction may be effected in reactors constructed of or lined with various materials which do not catalyze any undesirable side reactions, it is generally preferable to provide the reactor at least with an inner lining of glass such as Pyrex glass or fused silica.

It has been noted that when the oxidation reaction described herein is effected in the mentioned reactors (even when such reactors are made of or lined with, for example, Pyrex glass) it is frequently difficult to obtain wholly reproducible results. This is true even when new reactors are employed. It has also been found that reactions of the above-described character frequently stop, so that the mixture leaving the reaction zone contains substantially none, or only negligible amounts, of the desired oxygenated products. This is particularly true when in the course of an oxidation reaction a minor or mild explosion occurs within the reaction zone. Without any intention of being limited by any theory of the case, it is believed that the above-mentioned controlled oxidation reactions are at least initiated at the surface of the walls and that said surfaces may be or may become inactive so as to materially decrease or even totally inhibit the initiation of the chain reaction mechanism which apparently causes the conversion of the starting materials into the desired oxygenated compounds.

It is therefore an object of the present invention to avoid the above and other defects and to provide a process whereby the walls of the reactors employed for the hydrogen bromide-catalyzed oxidation reactions may be initially activated and/or may be repeatedly reactivated so that the reactors may be economically employed for the manufacture of oxygenated compounds in accordance with the above-mentioned process. It is another object of the present invention to effect the above-mentioned hydrogen bromide-catalyzed oxidation reactions in reactors the inner walls of which have been activated.

It has now been discovered that the above and other objects may be attained by treating the walls of the mentioned reactors with oxides of boron, and that high yields of the desired oxygenated products are obtained under reproducible conditions when the inner walls of reactors in which the above-outlined hydrogen bromide-catalyzed oxidation of organic compounds is effected are coated with oxides of boron. It was also found that it is possible to reactivate the walls of reactors (which walls have been rendered inactive for one reason or another), by the above-mentioned and hereinbelow more fully described treatment with the oxides of boron.

The use of the treatment of the reactor walls is not limited only to the activation of the walls of new reactors or to the reactivation of walls of reactors which have been rendered totally inactive due to mild explosions and the like. In some cases the yield of the desired oxygenated products obtained during the mentioned hydrogen bromide-catalyzed oxidation gradually decreases with continued operation. Also, such continued use of reactors frequently results in gradually increased yields of undesirable byproducts such as the products resulting from the decomposition of the carbon structure of the organic materials present in the reactor. This may be explained at least in part by a partial inactivation or poisoning of the reactor wall surfaces. In such cases it is advisable to interrupt the catalyzed oxidation prior to complete or substantially complete inactivation or poisoning of the reactor walls to effect the mentioned treatment with boron oxides so as to permit the obtaining of high and reproducible yields of the desired oxygenated compounds after such treatment.

The present process of treatment or activation of wall surfaces is to be used with hydrogen bromide-catalyzed oxidations of all organic compounds which contain at least one replaceable hydrogen atom. The invention is applicable and effective in processes involving the controlled oxidation of aliphatic hydrocarbons, and particularly saturated aliphatic hydrocarbons, as well as aromatic hydrocarbons, alkylated aromatic hydrocarbons, alicyclic hydrocarbons (which may or may not contain one or more saturated or unsaturated aliphatic side chains) as well as of their derivatives such as the products of their partial halo-substitution. Various other organic derivatives of these hydrocarbons, such as nitriles, ketones, alcohols, acids, etc., also fall within the class of organic compounds which may be employed as the starting material. For example, methyl ethyl ketone may be converted to diacetyl by the mentioned hydrogen bromide-catalyzed oxidation. A particularly suitable class of organic compounds which may be subjected to the hydrogen bromide-catalyzed controlled oxidation in reactors the surfaces of which have been treated or coated with oxides of boron in accordance with the process of the present invention comprises the straight-chain and branched-chain organic compounds such as the straight-chain or branched-chain saturated aliphatic hydrocarbons and products of their partial halo-substitution. Representative organic compounds of the class that may be oxidized in the mentioned activated reactors include the straight-chain and branched-chain aliphatic hydrocarbons such as ethane, propane, butanes, pentanes, hexanes, heptanes, octanes, and the like; the alicyclic hydrocarbons, e. g. cycloparaffins of the type of cyclobutane, cyclopentane, cyclohexane, and their homologs; the alkylated cycloparaffins such as methyl cyclopentane, methyl cyclohexane, and the like; the aryl, aralkyl and alkaryl hydrocarbons such as naphthalene, toluene, xylenes, ethyl benzene, n-propyl benzene, butyl benzenes, cumene, cymene, durene, and the like, and their homologs and analogs; and the partially halo-substituted derivatives of the mentioned and similar hydrocarbons, e. g. ethyl chloride, dichlorethane, dibromopropanes, dichloropropanes, monochlorbutanes, monobrombutanes, dichlorbutanes, dibrombutanes, monochlorcyclopentane, monochlorcyclohexane, benzyl chloride, benzyl bromide, and their homologs and analogs, also the corresponding unsaturated hydrocarbons and halo-substituted derivatives thereof are included in the above-defined class of organic compounds which may be used as the starting materials. As mentioned, the branched-chain saturated aliphatic hydrocarbons, and particularly the lower homologs thereof such as isobutane, as well as the halo-substituted derivatives of such hydrocarbons, are compounds which are especially suitable for the controlled hydrogen bromide-catalyzed oxidation in reactors which have been treated in accordance with the process of the present invention with the oxides of boron.

The activation of the reactor walls is effected by treatment with various oxides of boron. The term "oxides of boron" as employed herein and in the appended claims includes not only boric oxide but also the various boric acids such as tetraboric acid, metaboric acid, and orthoboric acid, and the borate salts, e. g. sodium borate. Of these it is preferred to use aqueous solutions and particularly dilute aqueous solutions of the orthoboric acid. Generally speaking, the activation of even completely deactivated wall surfaces of reactors may be effected by a mere washing or rinsing of the reactor walls with an aqueous solution of boric acid. The acid concentration in the aqueous solution may vary within relatively wide limits. It has been found that solutions having a boric acid concentration of between about 1 percent and about 5 percent may be adequately and satisfactorily employed, and that reactors which have been washed or rinsed with, for example, a 2.5 percent aqueous solution of boric acid are completely activated or reactivated so that use of such reactors for the above-mentioned controlled oxidation results in the attaining of high yields of the desired oxygenated products without the production of undesirable degradation products. When it is desired to treat the reactor walls with solutions of higher concentrations, it is possible to use either concentrated or saturated aqueous boric acid solutions which are maintained at elevated temperatures, e. g. about 100° C. A preferred method of treating the reactor walls comprises a washing or rinsing of the surfaces with the above-mentioned aqueous boric acid solution, followed by a withdrawal or draining of excess solution and a subsequent drying, preferably under a vacuum and at elevated temperatures which may vary within very wide limits. This drying may be effected at temperatures ranging from about 100° C. to as high as 250° C., and even above, although satisfactory results have been obtained by a drying of the walls washed with aqueous boric acid solutions under a vacuum and at a temperature in the neighborhood of 140° C. to 150° C. Although there is no intention of being limited by any theory of the case, it is believed at the present time that the above-mentioned treatment of reactor walls with boric acid, which treatment in its preferred form includes the drying step (or the step of decomposing the boric acid to boron oxide), results in the depositing on or coating of the wall surfaces with an oxide of boron which either inhibits the undesirable catalytic effect of some substance or substances present in or on the surface of the walls or, in the alternate, acts as a sensitizer or catalyst which aids in the desired oxidation which, as stated, is initiated and/or promoted by the presence of hydrogen bromide in the reaction zone during the reaction of the organic compounds treated with oxygen. In lieu of using aqueous boric acid solutions, the mentioned activation treatment may also be effected by means of alcoholic solutions of, for example, $B_2O_3$.

The treatment of the reactor walls with oxides of boron, which treatment apparently results in the formation of a layer of a boron oxide on the reactor wall surfaces is advantageous in that it prevents large-scale decomposition of the desired products of oxidation, thereby permitting the obtaining and recovery of high and reproducible yields of the desired oxygenated products which in most cases contain the same number of carbon atoms per molecule as present in the starting organic material. Such coating with boron oxides may be effectively realized both in the cases of new reactors and where the reactors were already employed for the mentioned hydrogen bromide catalyzed oxidation.

The following examples are illustrative of the process of the present invention and disclose the advantages derived from the treatment of reactor wall surfaces with oxides of boron. It is to be understood, however, that there is no intention of being limited by any specific details presented in these examples.

*Example I*

A Pyrex glass reactor having a volume of about 400 cc. was rinsed with a 2.5 percent solution of boric acid ($H_3BO_3$), this treatment being followed by the draining of the excess solution and a drying under a vacuum and at a temperature of 145° C. Thereafter a 7:7:1 vaporous mixture of isobutane, oxygen and hydrogen bromide was introduced into the reactor and subjected therein to a temperature of approximately 145° C. An analysis of the reaction products thus obtained indicated that the oxygen consumption was equal to about 92%. Also, it was found that the maximum pressure decrease was equal to 127 mm., and that the maximum rate of pressure drop was equal to 3.5 mm./min.

The reproducibility of the results obtained in the above example were shown by repeating the above run in two other Pyrex glass reactors which had been treated with boric acid solution prior to their use in the same manner as that described in the first example. The oxygen consumption in the second and third runs were 80% and 86%, respectively, the maximum rates of pressure drop being 3.6 mm./min. and 3.8 mm./min., respectively. Also, throughout the three above-mentioned runs there was a continuous drop in the pressure within the reactor, thus indicating that very little if any decomposition of the reaction product or products occurred. The yield of organic peroxides, e. g. tertiary butyl hydroperoxide, based on the consumed oxygen, was above 75% in each of the above runs.

*Example II*

Three runs were effected in individual unannealed and untreated Pyrex glass reactors. In each case the reactor had a volume of about 400 cc. A 7:7:1 vaporous mixture of isobutane, oxygen and hydrogen bromide was introduced in like amounts into each of the reactors, these substances being then subjected in the reactors to a temperature of about 145° C. The mixture in the first reactor was thus treated for about 70 minutes, while the reactants in the other two reactors were subjected to the above-mentioned treatment for 104 minutes and 55 minutes respectively. An analysis of the reaction products in the three runs showed that the oxygen consumption was 54% in the first run and about 6% in the second run. The erratic character of the reactions may be gleaned from the fact that the maximum rates of pressure drop in these runs were 12, 1 and 4 mm./min., respectively. Also, the maximum pressure drops in the various reactors were markedly different from each other. Additionally, it was found that these maximum drops in pressure occurred at various periods of time after the initiation of the reaction and that the pressures in the reactors thereafter increased, thus indicating that considerable decomposition of the carbon structure of the isobutane and/or of the peroxides occurred. An analysis of the reaction products obtained in these runs also showed that these reaction products contained only minor amounts of the peroxides, even in the case where more than 50% of the oxygen introduced into the reactor was consumed as was the case in the first of the three runs described in this example.

*Example III*

The runs described in Example II were repeated in untreated Pyrex reactors using the same volumetric ratios of the reactants and of hydrogen bromide. In this case, however, the oxidation reactions were effected at a temperature of about 156° C. An analysis of the pressure drops occurring in each of the runs, as well as the analyses of the reaction products obtained indicated th he results were no less erratic than those obtained when the oxidation reaction was effted at a temperature of 145° C. Also, there were btained high yields of undesirable by-products rimarily caused by the decomposition of the carbon structures of the isobutane and of the products of oxidation.

*Example IV*

Three Pyrex glass reactors were first heated in the presence of air to a temperature about 550° C. Thereupon like amounts o. a 7:7:1 vapurous mixture of isobutane, oxygen and hydrogen bromide were introduced into each of said reactors, these vaporous mixtures being then subjected to temperatures of about 145° C. The mixture in the first of these reactors was thus treated for about 70 minutes, while the mixtures in the other two runs were subjected to the above temperature for a period of about 18 minutes. The maximum pressure decreases in the three runs were 42, 26 and 6 mm. respectively, the maximum rates of pressure drop being equal to about 12, 26 and 5 mm./min. respectively. In the first run the oxygen consumption was equal to 54%, while only 28% of the introduced oxygen was consumed in the second of these runs. The erratic character of the reactions was also shown by the fact that whereas the maximum pressure drop in the first of these runs occurred at the end of about 7 minutes this maximum pressure drop was found at the end of about two to three minutes in the other two runs. Also, large amounts of products of decomposition of the carbon structure were found in the reaction product as evidenced by a gradual increase in the pressure in the reactor.

*Example V*

The following run was effected to prove that deactivated reactors may be readily reactivated by treatment with boric acid in accordance with the process of the present invention. The reactor employed in this run was the same as that used previously for the hydrogen bromide-catalyzed oxidation of isobutane at a temperature of about 145° C. The results of this oxidation showed that the Pyrex glass reactor was virtually if not totally inactive since substantially no consumption of oxygen was found, even after a relatively long period of treatment. This reactor was then rinsed with a 2.5% solution of boric acid, the excess solution being then drained and the reactor being subsequently subjected to a vacuum at a temperature of 145° C. The reactor thus treated was then employed for the hydrogen bromide-catalyzed oxidation of isobutane, a 7:7:1 vaporous mixture of isobutane, oxygen and hydrogen bromide being subjected therein to a temperature of 145° C. for a period of about 70 minutes. It was found that the pressure dropped consistently throughout the run, that about 92% of the oxygen present in the reactor was consumed, that the yield of tertiary butyl hydroperoxide was about 74% based on the consumed oxygen, and that only a minor amount of products of degradation were present in the reaction product.

*Example VI*

The inner walls of a Pyrex glass reactor having a volume of 350 cc. were first coated with silica and then the reactor was employed for the hydrogen bromide-catalyzed oxidation of isobutane. For this purpose a 7:7:1 vaporous mixture of isobutane, oxygen and hydrogen bromide was introduced into the reactor wherein the mixture was subjected to a temperature of 145° C. It was found that the maximum pressure drop was only equal to about 6 mm. Also, although 15% of the oxygen was consumed during this treatment, an analysis of the reaction products failed to show any noticeable amounts of peroxides.

The reactor was then rinsed with a 5% aqueous solution of boric acid and, after draining the excess solution, was dried under a vacuum. The above-mentioned oxidation reaction was then repeated in the thus treated reactor. The maximum pressure drop was found to be greater than 116 mm., about 92% of the oxygen reacting. The yield of peroxides based on the consumed oxygen was equal to 76%.

*Example VII*

A Pyrex glass reactor having a volume of about 400 cc. was rinsed with a 5% boric acid solution, the excess of which was then allowed to drain out. The thus treated vessel was then subjected to a temperature of between about 300° C. and about 350° C. for a period of about 2½ hours. Since boric acid decomposes with loss of water at about 300° C., said decomposition starting at about 185° C., the above treatment should have converted the boric acid to boron oxide ($B_2O_3$) or to a partially hydrated boron oxide.

The reactor treated in this manner was then employed for the oxidation of isobutane in the same manner as that employed in the preceding example. During the run the maximum pressure decrease was found to be equal to 122 mm. An analysis of the reaction products showed that about 90% of the introduced oxygen was consumed, the yield of peroxides based on the consumed oxygen being equal to 83%.

A comparison of these results with the results obtained when isobutane was oxidized in the presence of hydrogen bromide in reactors treated with boric acid, which reactors were however heated to only 145° C., shows that the drying temperature has substantially no effect on the yields of the peroxides obtained, and that the beneficial effects of boric acid and of boron oxide on the specified reaction are substantially the same.

Example VIII

A Pyrex glass reactor having a volume of about 400 cc. was coated with sodium tetraborate. A 7:7:1 vaporous mixture of isobutane, oxygen and hydrogen bromide was introduced into this reactor and subjected therein to a temperature of about 145° C. It was found that the coating of the walls with sodium tetraborate caused the reaction to proceed at a rate of 17.9 mm./min. pressure drop as compared to a rate varying between 1 and 4 mm./min. in an untreated reactor. The use of the borate, however, did not prevent the relatively high decomposition of the peroxidic reaction products as evidenced by the presence of appreciable amounts of acetone in the product. The use of reactors coated with the above and like borate salts is therefore advantageous for reactions in which the desired oxygenated product or products are more stable than the peroxides formed by the herein described hydrogen bromide-catalyzed oxidation of branched-chain aliphatic hydrocarbons. Thus, such coatings are beneficial in the oxidation of straight chain alkanes, e. g. ethane, in view of the relative stability of the formed corresponding acids.

Although the above examples have shown the advantages of the claimed process with particular reference to the oxidation of isobutane to produce organic peroxides of the type of tertiary butyl hydroperoxide and di(tertiary butyl-peroxide, substantially the same advantages are obtained when the reactors treated in accordance with the claimed invention are used for the hydrogen bromide-catalyzed oxidation of other organic compounds, e. g. hydrocarbons, disclosed above. For instance, the treatment of reactor walls with oxides of boron (which term includes the salts of borates) in accordance with the process of the present invention, may be effectively realized both before and during the use of the reactors for the hydrogen bromide-catalyzed oxidation of isopentane or of straight-chain saturated aliphatic hydrocarbons such as ethane, propane, or butane.

Also, although the above examples have shown the advantages of the claimed process with particular reference to the treatment of Pyrex glass reactors which are employed for the hydrogen bromide-catalyzed oxidation, the invention is not limited to the treatment of this type of reactor, since the treatment in accordance wih the process of the present invention is equally applicable to the walls of reactors made of or lined with other substances. Furthermore, the oxidation reaction in the treated reactors may be effected in a continuous or interrupted manner.

We claim as our invention:

1. In a process for the production of peroxidic compounds selected from the group consisting of tertiary butyl hydroperoxide, di(tertiary butyl)-peroxide and mixtures thereof, the steps of reacting substantially equivolumetric vaporous amounts of isobutane and oxygen, at a superatmospheric pressure and at a temperature of between about 150° C. and about 200° C. in the presence of hydrogen bromide, and effecting the reaction in a reaction vessel having inner surfaces constructed of glass the walls of which are coated with an oxide of boron.

2. In a process for the production of peroxidic compounds, the steps of reacting a vaporous mixture comprising oxygen and a saturated aliphatic hydrocarbon containing a tertiary carbon atom in the presence of hydrogen bromide, at a temperature of between about 100° C. and the temperature at which spontaneous combustion of the mixture occurs, and effecting said reaction in a reaction vessel having inner surfaces constructed of glass the walls of which are coated with an oxide of boron.

3. In a process for the production of organic peroxides, the steps of reacting a vaporous mixture comprising oxygen and a saturated aliphatic hydrocarbon containing a tertiary carbon atom, in the presence of hydrogen bromide, at an elevated temperature which is below the spontaneous combustion temperature of the mixture, effecting said reaction in a reaction vessel having inner surfaces constructed of glass the inner walls of which have been treated with an oxide of boron, conducting said reaction for a period of time sufficient to cause the controlled catalytic oxidation of the hydrocarbon employed, and recovering the peroxidic compounds from the resultant mixture.

4. In a process for the controlled oxidation of saturated aliphatic hydrocarbons, the steps of subjecting vapors of a saturated aliphatic hydrocarbon to the action of oxygen, in the presence of hydrogen bromide and at an elevated temperature which is below that at which spontaneous combustion occurs, effecting said reaction in a vessel having inner surfaces constructed of glass the wall surfaces of which have been treated with an oxide of boron, and continuing said reaction for a period of time sufficient to effect a substantial reaction between the saturated aliphatic hydrocarbon and the oxygen.

5. In a process for the production of peroxidic compounds selected from the group consisting of tertiary butyl hydroperoxide, di(tertiary-butyl)-peroxide, and mixtures thereof, the steps of continuously conveying a mixture comprising substantially equivolumetric amounts of isobutane and oxygen and a volumetric amount of hydrogen bromide equal to about one half that of the isobutane through a Pyrex glass reaction vessel, maintaining said reactants in the reaction vessel at a temperature of about 200° C., at a superatmospheric pressure and for a period of time sufficient to realize the oxidation of the isobutane to said peroxidic compounds, and periodically interrupting said oxidation step to reactivate the reaction vessel wall surfaces by contacting them with an aqueous boric acid solution and by subjecting the thus contacted surface to an elevated temperature.

FREDERICK F. RUST.
JOHN H. RALEY.

REFERENCES CITED

The following references are of record in the file of this patent:

UNITED STATES PATENTS

| Number | Name | Date |
|---|---|---|
| 2,270,195 | Tadema | Jan. 13, 1942 |
| 2,303,658 | Porter | Dec. 1, 1942 |
| 2,365,851 | Thomas | Dec. 26, 1944 |
| 2,369,181 | Rust | Feb. 13, 1945 |
| 2,369,182 | Rust | Feb. 13, 1945 |
| 2,395,523 | Vaughan | Feb. 26, 1945 |